March 5, 1940.     H. M. ULLSTRAND     2,192,338
REFRIGERATION
Filed April 7, 1938
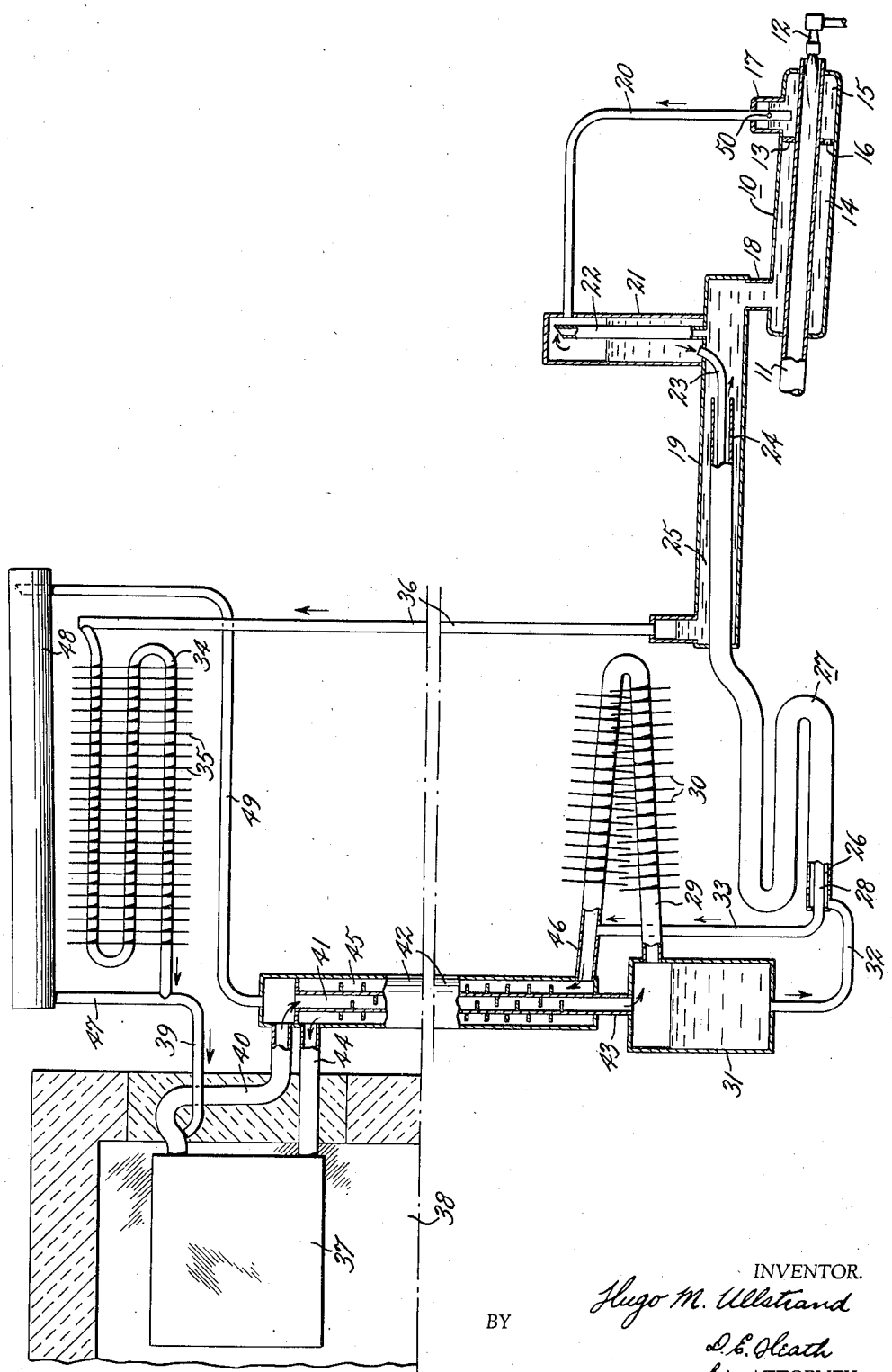
INVENTOR.
Hugo M. Ullstrand
D. E. Heath
his ATTORNEY.

Patented Mar. 5, 1940

2,192,338

UNITED STATES PATENT OFFICE 2,192,338

REFRIGERATION

Hugo M. Ullstrand, Evansville, Ind., assignor to Servel, Inc., New York, N. Y., a corporation of Delaware Application April 7, 1938, Serial No. 200,573

21 Claims. (Cl. 62—119.5)

My invention relates to refrigeration and it is an object of the invention to provide an absorption type refrigeration system having increased efficiency.

The drawing shows more or less diagrammatically a refrigeration system embodying the invention. A generator 10 is provided with a flue 11 and is heated by a gas burner 12 arranged so that the flame is projected into the lower end of the flue 11. The generator is divided by a partition 13 into chambers 14 and 15. These chambers communicate with each other through an opening 16 in the lower part of partition 13. Chamber 15 is provided with a dome 17.

Chamber 10 is connected by a conduit 18 to one end of what may be referred to as a triple heat exchanger 19. Chamber 15 is connected by a conduit 20 to the upper part of a circulation vessel 21. The upper part of vessel 21 is also connected by a conduit 22 to the upper part of one end of exchanger 19. The lower part of vessel 21 is connected to one part of a conduit 23 which runs substantially centrally of and forms what will be referred to as the center passage of exchanger 19. Concentrically around conduit 23 is located a conduit 24 which forms what will be referred to as the middle passage of the exchanger 19. Conduit 24 is open at one end within exchanger 19. The space 25 between conduit 24 and the casing of exchanger 19 forms what will be referred to as the outside passage.

Conduit 24 is a continuation of or is connected to an outer passage 26 of a liquid heat exchanger 27. Conduit 23 is a continuation of or is connected to an inside passage 28 of the liquid heat exchanger 27.

An absorber comprises a pipe coil 29 provided with heat transfer fins 30 for direct air cooling, and an accumulation vessel or sump 31. The lower end of coil 29 is connected to the upper part of sump 31. The lower part of sump 31 is connected by a conduit 32 to the outer passage 26 of liquid heat exchanger 27. The inner passage 28 of liquid heat exchanger 27 is connected by a conduit 33 to the upper part of absorber coil 29.

A condenser comprises a pipe coil 34 provided with heat transfer fins 35 for direct air cooling. The upper part of condenser 34 is connected by a conduit 36 to the upper part of one end of the triple heat exchanger 19.

An evaporator 37 is located in the upper part of a thermally insulated refrigerator storage compartment 38. The lower end of condenser 34 is connected by a conduit 39 to the upper end of evaporator 37.

The upper part of evaporator 37 is connected by a conduit 40, inner passage 41 of a gas heat exchanger 42, and conduit 43 to the upper part of the absorber sump 31. The lower end of evaporator 37 is connected by a conduit 44, outer passage 45 of the gas heat exchanger 42, and conduit 46 to the upper end of absorber coil 29. The lower end of condenser 34 is connected by a conduit 47, a gas accumulation vessel 48, and conduit 49 to the inner passage 41 of gas heat exchanger 42. The lower end of conduit 20 extends through dome 17 and into chamber 15 of the generator 10. Within dome 17, conduit 20 is provided with a hole 50. Conduit 20 forms a thermosyphon or vapor liquid lift from generator chamber 15 into circulation vessel 21.

The gas burner 12 may be thermostatically controlled responsive to temperature of the evaporator 37. Other suitable means may be used for heating the generator.

The system of which the parts and their connections have just been described contains refrigerant fluid, a liquid absorbent therefor, and an auxiliary fluid or inert gas. These fluids may be ammonia, water, and hydrogen, respectively. In operation, the gas burner 12 heats generator 10 and causes expulsion of ammonia vapor out of solution. Vapor formed in chamber 15 flows through conduit 20, conduit 22, outer passage 25 of exchanger 19, and conduit 36 to the condenser 34. Ammonia vapor condenses to liquid in condenser 34. The ammonia liquid flows from the condenser through conduit 39 into evaporator 37.

Liquid ammonia evaporates and diffuses into hydrogen in evaporator 37, producing a refrigerating effect. Ammonia vapor and hydrogen flow from the evaporator through conduit 40, gas heat exchanger 42 and the upper part of sump 31 into the lower end of absorber coil 29. Ammonia vapor is absorbed into weakened absorption liquid which enters the upper part of the absorber through conduit 33. Weak gas returns from the upper end of the absorber through gas heat exchanger 42 and conduit 44 to the evaporator. Circulation of gas in the absorber-evaporator circuit is caused by difference in specific weights of ammonia in the rich and weak gas.

Circulation of absorption liquid in the absorber-generator circuit is caused by upward flow of liquid through conduit 20 by thermosyphon or vapor lift action. When the surface level of liquid in circulation vessel 21 rises above the upper end of conduit 33, liquid flows from vessel 21 through conduit 23, inner passage 28 of liquid heat exchanger 27, and conduit 33 into the absorber. The liquid flows downward through the absorber into the sump 31. Enriched absorption liquid flows from sump 31 through conduit 32, outer passage 26 of liquid heat exchanger 27, and conduit 24 into the triple heat exchanger 19, and thence through conduit 18 into chamber 14 of the generator.

Vapor expelled from solution in generator chamber 14 flows upward through conduit 18 into the triple heat exchanger 19 and with vapor which enters the triple heat exchanger through conduit 22 bubbles through liquid in outer passage 25 of exchanger 19 and then flows through conduit 36 to the condenser as previously described.

Heat exchange is carried out between warm weak solution flowing from the generator toward the absorber and cooler strong solution flowing from the absorber toward the generator in both the liquid heat exchanger 27 and part of the triple heat exchanger 19. In the triple heat exchanger 19, there is also carried out heat transfer from expelled vapors. This heat is transferred to cooler strong solution flowing toward the generator.

Cooling of vapors in triple heat exchanger 19 causes condensation of water vapor. The liquid condensate contains liquid ammonia at a concentration substantially corresponding to an equilibrium condition with the vapor pressure of ammonia in the gas from which condensation is taking place. This equilibrium condition is also dependent upon the temperature. The concentration of this condensate increases in the direction toward the cooler end of the triple heat exchanger 19 away from the end which is connected to the generator. If vapors undergoing rectification or analyzation as described, were bubbled through strong absorption liquid as it comes from the absorber, it might occur that dilution of the condensate would effect the equilibrium conditions under which the vapor finally passes out of contact with the liquid. It is desired that the gas pass out of contact with liquid which has the greatest ammonia concentration, so that the vapor will contain the least amount of water vapor. This is accomplished in the previously described structure because the outside passage or space 25 of the triple heat exchanger 19 is a dead end as far as liquid is concerned to the level of the open end of conduit 24. Liquid stands in passage 25 to about the same level as that of liquid in the absorber sump 31. If there is addition of liquid to space 25, it must flow out of this dead end liquid space. Therefore, as condensate is added to liquid in passage 25 from vapors bubbling therethrough, it occurs that liquid in passage 25 is displaced by the condensate until this whole space 25 to the level of the open end of conduit 24 is filled with condensate. This condensate has a gradient concentration due to the temperature gradient increasing toward the cooler end of the heat exchanger so that vapor leaving exchanger 19 to enter the lower end of conduit 36 comes out of contact with liquid having the greatest concentration of ammonia wherefore the vapor contains the least amount of water vapor. This represents a saving in heat loss because the heat of rectification is transferred to liquid in the system. There is also accomplished a submersion type analyzer which is also a rectifier in that gases come out of contact with liquid which was formed by condensation from the gas. The result is increase in efficiency of operation of the system.

What is claimed is:

1. A process of treating vapor by flowing the vapor in the presence of cooler liquid and shielding the vapor from physical contact with the liquid by condensate from the vapor.

2. A process as in claim 1 in which the vapor is bubbled through liquid.

3. A process as in claim 1 in which the vapor is vaporous refrigerant and the liquid is a solution of the refrigerant.

4. Rectification of vapor by injecting the vapor into a cooler liquid body and shielding the vapor from physical contact with the liquid before and during removal of the vapor from the body so that the vapor leaves the body in substantial equilibrium with condensate from the vapor.

5. Rectification as in claim 4 in which the vapor is vaporous refrigerant and the liquid body is a solution of the refrigerant.

6. Rectification as in claim 4 in which the vapor is vaporous refrigerant and the liquid body is a solution of the refrigerant, together with the further step of heating liquid from said body to form said vapor.

7. Rectification as in claim 4 in which the vapor is vaporous refrigerant and the liquid body is a solution of the refrigerant, together with the further steps of withdrawing solution and condensate from said body, heating the withdrawn liquid to form vapor by expulsion, and conveying the heated liquid in heat transfer with either the withdrawn liquid or liquid body or both.

8. An absorption refrigeration process which includes flowing liquid refrigerant solution to and from a place of vapor expulsion by thermosyphon or vapor liquid lift action, conducting the liquid flowing from said place of vapor expulsion in heat exchange relation with the liquid flowing to said place of vapor expulsion, bringing vapor from said place down to the level of and into heat transfer relation out of direct contact with liquid flowing to said place while the latter is in said heat exchange relation with the liquid flowing from said place, and conducting condensate from the presence of the vapor by gravity.

9. A process as in claim 8 in which said direct contact is prevented by condensate before removal from the presence of the vapor.

10. A process as in claim 8 in which the vapor first bubbles through said liquid flowing to the place of vapor expulsion.

11. A vapor rectifier having a horizontally elongated dead-end liquid space and a vapor outlet from the dead end of said liquid space.

12. A vapor rectifier having a liquid passage, a dead-end liquid space communicating and arranged in thermal exchange relation with said passage, and a vapor outlet from the dead end of said liquid space.

13. A heat exchanger having separate passages for liquid, a dead-end liquid space communicating and arranged in thermal exchange relation with one of said passages, a vapor inlet, and a vapor outlet from the dead end of said liquid space.

14. In an absorption refrigeration system, an absorber, a first heating zone, a second heating zone, members for circulation of absorption liquid through said absorber and heating zones, said members and one of said heating zones cooperating to cause said liquid circulation by thermosyphon or vapor lift action, and means to conduct vapor from either of said zones or both down to the level of said absorption liquid in its path of flow from said absorber toward said heating zones and there pass said vapor in thermal exchange relation out of direct contact with said absorption liquid and permit condensate to remove from the presence of said vapor by gravity.

15. A system as in claim 14 in which said means bubbles the vapor through liquid in said thermal exchange relation.

16. A system as in claim 14 in which said condensate prevents said direct contact of vapor and absorption liquid before the condensate is removed from the presence of the vapor.

17. An absorption refrigeration system including a generator, an absorber, a thermosyphon or vapor lift for causing circulation of absorption liquid through and between said generator and absorber, means for conducting in thermal exchange relation absorption liquid flowing from said generator and absorption liquid flowing to said generator, and means for conducting vapor from said generator down to the level of and into thermal exchange relation out of physical contact with absorption liquid flowing toward said generator while the latter is in said thermal exchange relation with absorption liquid flowing from said generator, and removing condensate from the presence of vapor by gravity flow.

18. A system as in claim 17 in which said last means causes bubbling of vapor through liquid, and said condensate prevents said contact between vapor and absorption liquid.

19. A method of refrigeration which includes expelling refrigerant from absorption liquid at a place of heating, liquefying the expelled refrigerant, evaporating liquefied refrigerant, absorbing evaporated refrigerant into absorption liquid, flowing both vapors from said place of heating and weakened absorption liquid from said place of heating in simultaneous heat transfer relation out of physical contact with absorption liquid flowing to said place of heating at a place of heat exchange to cause cooling of weakened absorption liquid and rectification by condensation of vaporous absorption liquid, conducting the condensate by gravity flow into the presence of absorption liquid flowing to said place of heating, and raising the liquid and condensate to cause said liquid flow.

20. A method of refrigeration as set forth in claim 19 in which the raising of liquid is carried out by thermosyphonic or vapor lift action.

21. A method of refrigeration as set forth in claim 19 in which vapors flowing from said place of heating to said place of heat exchange pass in physical contact with absorption liquid flowing to said place of heating before the liquid is raised to cause liquid flow.

HUGO M. ULLSTRAND.